(12) United States Patent
Kosakowski et al.

(10) Patent No.: US 9,112,559 B2
(45) Date of Patent: Aug. 18, 2015

(54) LOW COMPLEXITY AND ACCURATE CLUSTER OF BEAMS SELECTION

(71) Applicant: Research In Motion Limited, Waterloo (CA)

(72) Inventors: Martin Kosakowski, Bochum (DE); Erwin Hemming, Herne (DE)

(73) Assignee: BlackBerry Limited, Waterloo, Ontario (CA)

( * ) Notice: Subject to any disclaimer, the term of this patent is extended or adjusted under 35 U.S.C. 154(b) by 122 days.

(21) Appl. No.: 13/921,653

(22) Filed: Jun. 19, 2013

(65) Prior Publication Data
US 2014/0376600 A1 Dec. 25, 2014

(51) Int. Cl.
*H04B 7/02* (2006.01)
*H04B 7/04* (2006.01)

(52) U.S. Cl.
CPC .................................. *H04B 7/0478* (2013.01)

(58) Field of Classification Search
CPC .. H04B 7/0456; H04B 7/0639; H04B 7/0658; H04B 7/0663; H04B 7/0478; H04L 2025/03426
USPC ................................................ 375/260, 267
See application file for complete search history.

(56) References Cited

U.S. PATENT DOCUMENTS

2007/0099578 A1* 5/2007 Adeney et al. .................. 455/69
2011/0122968 A1* 5/2011 Jongren et al. ................ 375/296

* cited by examiner

*Primary Examiner* — David B. Lugo
(74) *Attorney, Agent, or Firm* — Thomas Grzesik; Fleit Gibbons Gutman Bongini & Bianco P.L.

(57) ABSTRACT

A method at user equipment 'UE', the method comprising: determining one or more radio channel estimates from received signals; selecting a precoding index fulfilling an optimization criterion based on the one or more radio channel estimates and a reduced precoding matrix, wherein the reduced precoding matrix comprises properties of a single beam for each of one or more polarization planes, and the reduced precoding matrix corresponds to an expanded precoding matrix comprising properties of a plurality of beams for each of one or more polarization planes; and transmitting a precoding matrix indicator 'PMI' based on the selected precoding index.

23 Claims, 7 Drawing Sheets

$$B = \begin{bmatrix} 1 & 1 & 1 & 1 & \cdots & 1 & 1 \\ 1 & e^{j\frac{2\pi}{32}} & e^{j\frac{4\pi}{32}} & e^{j\frac{6\pi}{32}} & \cdots & e^{j\frac{60\pi}{32}} & e^{j\frac{62\pi}{32}} \\ 1 & e^{j\frac{4\pi}{32}} & e^{j\frac{8\pi}{32}} & e^{j\frac{12\pi}{32}} & \cdots & e^{j\frac{120\pi}{32}} & e^{j\frac{124\pi}{32}} \\ 1 & e^{j\frac{6\pi}{32}} & e^{j\frac{12\pi}{32}} & e^{j\frac{18\pi}{32}} & \cdots & e^{j\frac{180\pi}{32}} & e^{j\frac{186\pi}{32}} \end{bmatrix}$$

32x 4TxDFT beams / 4Tx $b_1$ (n=1)

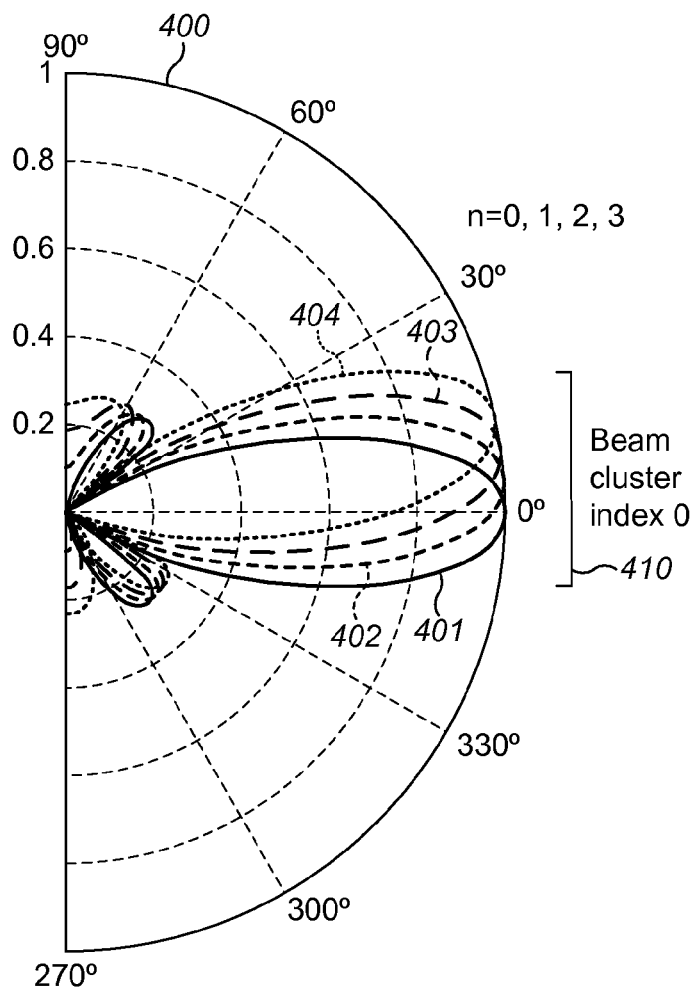
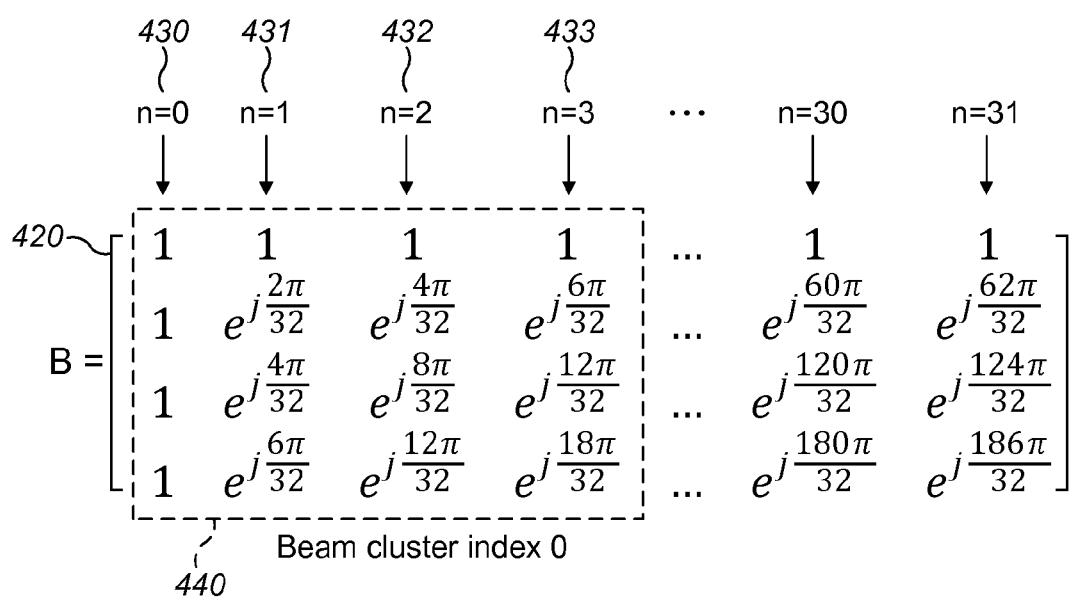
FIG. 4

$$W_1^{(k=0)} = \begin{bmatrix} 1 & 1 & 1 & 1 & 0 & 0 & 0 & 0 \\ 1 & e^{j\frac{2\pi}{32}} & e^{j\frac{4\pi}{32}} & e^{j\frac{6\pi}{32}} & 0 & 0 & 0 & 0 \\ 1 & e^{j\frac{4\pi}{32}} & e^{j\frac{8\pi}{32}} & e^{j\frac{12\pi}{32}} & 0 & 0 & 0 & 0 \\ 1 & e^{j\frac{6\pi}{32}} & e^{j\frac{12\pi}{32}} & e^{j\frac{18\pi}{32}} & 0 & 0 & 0 & 0 \\ 0 & 0 & 0 & 0 & 1 & 1 & 1 & 1 \\ 0 & 0 & 0 & 0 & 1 & e^{j\frac{2\pi}{32}} & e^{j\frac{4\pi}{32}} & e^{j\frac{6\pi}{32}} \\ 0 & 0 & 0 & 0 & 1 & e^{j\frac{4\pi}{32}} & e^{j\frac{8\pi}{32}} & e^{j\frac{12\pi}{32}} \\ 0 & 0 & 0 & 0 & 1 & e^{j\frac{6\pi}{32}} & e^{j\frac{12\pi}{32}} & e^{j\frac{18\pi}{32}} \end{bmatrix}$$

FIG. 6

$$W_1^{(k=0)} = \begin{bmatrix} 1 & 1 & 1 & 1 & 0 & 0 & 0 & 0 \\ 1 & e^{j\frac{2\pi}{32}} & e^{j\frac{4\pi}{32}} & e^{j\frac{6\pi}{32}} & 0 & 0 & 0 & 0 \\ 1 & e^{j\frac{4\pi}{32}} & e^{j\frac{8\pi}{32}} & e^{j\frac{12\pi}{32}} & 0 & 0 & 0 & 0 \\ 1 & e^{j\frac{6\pi}{32}} & e^{j\frac{12\pi}{32}} & e^{j\frac{18\pi}{32}} & 0 & 0 & 0 & 0 \\ 0 & 0 & 0 & 0 & 1 & 1 & 1 & 1 \\ 0 & 0 & 0 & 0 & 1 & e^{j\frac{2\pi}{32}} & e^{j\frac{4\pi}{32}} & e^{j\frac{6\pi}{32}} \\ 0 & 0 & 0 & 0 & 1 & e^{j\frac{4\pi}{32}} & e^{j\frac{8\pi}{32}} & e^{j\frac{12\pi}{32}} \\ 0 & 0 & 0 & 0 & 1 & e^{j\frac{6\pi}{32}} & e^{j\frac{12\pi}{32}} & e^{j\frac{18\pi}{32}} \end{bmatrix}$$

$$W_{1,new}^{(k=0)} = \begin{bmatrix} 1 & e^{j\frac{3\pi}{32}} & e^{j\frac{6\pi}{32}} & e^{j\frac{9\pi}{32}} & 0 & 0 & 0 & 0 \\ 0 & 0 & 0 & 0 & 1 & e^{j\frac{3\pi}{32}} & e^{j\frac{6\pi}{32}} & e^{j\frac{9\pi}{32}} \end{bmatrix}$$

FIG. 7

LOW COMPLEXITY AND ACCURATE CLUSTER OF BEAMS SELECTION

FIELD OF THE TECHNOLOGY

The present disclosure relates to electronic devices, wireless communication systems, and methods of operation therefore, for facilitating channel state information (CSI) reporting.

BACKGROUND

The process of dynamically optimising signal and protocol parameters for a given instantaneous channel condition is known as link adaptation. With the example of an evolved Node B (eNb) base station communication with a user equipment (UE), the link adaptation process involves the UE sending feedback information to the eNb with details of channel conditions and suggested protocol parameters. By doing so, the eNb can adjust its transmission parameters to achieve higher throughput of data or increase the coverage.

One of the parameters sent in CSI reporting is an indication of a preferred precoding for the eNb to use, wherein a well-chosen precoding can allow the eNb to direct its transmission towards the UE's location.

Improvements in determining an optimum precoding choice for CSI reporting are desirable.

BRIEF DESCRIPTION OF DRAWINGS

Examples of the present proposed approach will now be described in detail with reference to the accompanying drawings, in which:

FIG. 4 shows a polar diagram illustrating the signal strength in the antenna plane of example beams transmitted in an eNb, and also shows a corresponding matrix representing the properties of the beams;

FIG. 6 is an example precoding matrix, $W_1$, for an index k=0;

FIG. 7 illustrates a comparison of an example precoding matrix, $W_1$, for a cluster of beams, and a corresponding simplified precoding matrix, $W_{1,new}$ in accordance with the proposed solution.

DETAILED DESCRIPTION

Figure 1:
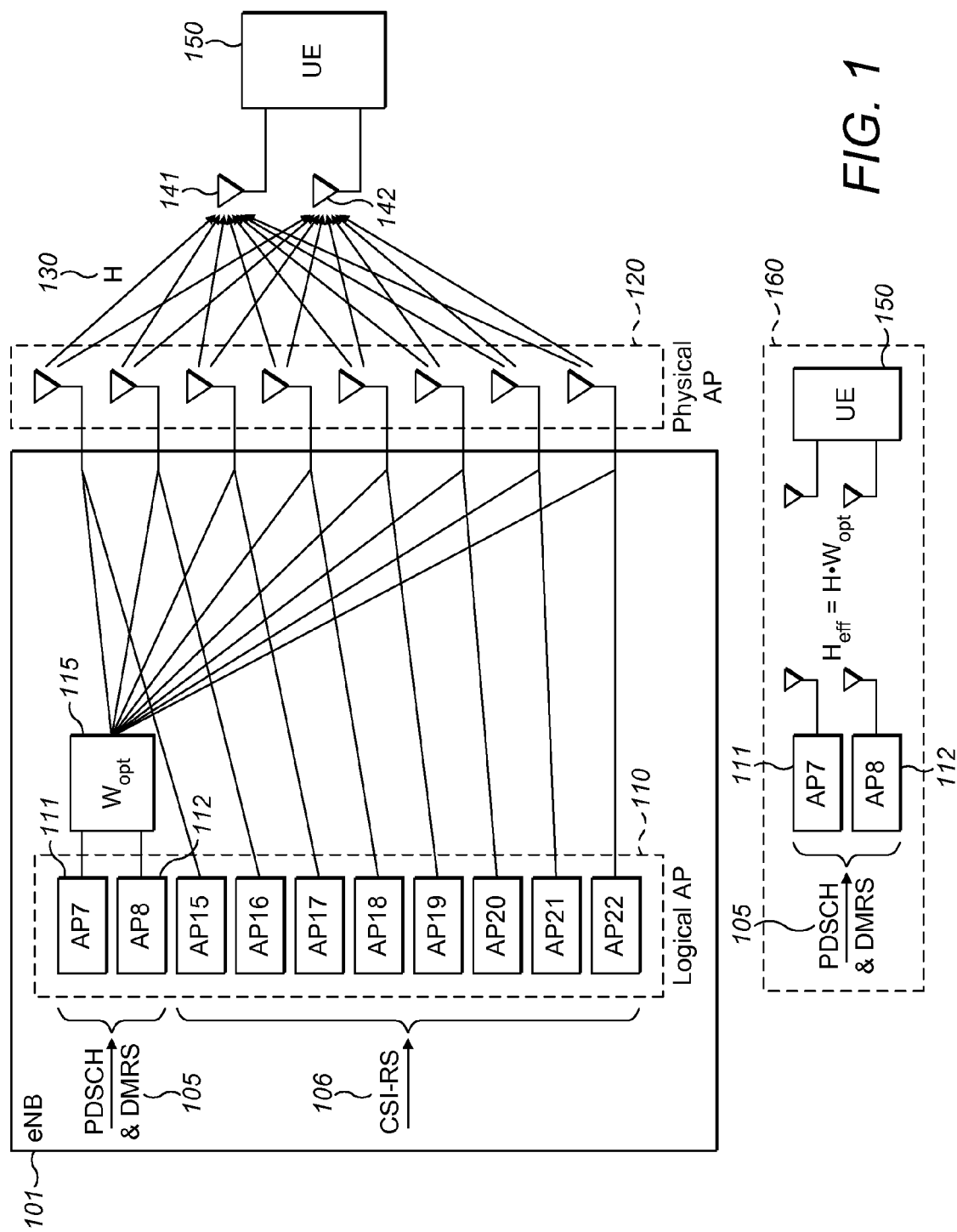
FIG. 1 is a simplified block diagram of an eNb and a UE communicating in an 8×2 antenna configuration in accordance with example embodiments of the present disclosure.

In one embodiment, the present disclosure provides a method at user equipment 'UE', the method comprising: determining one or more radio channel estimates from received signals; selecting a precoding index fulfilling an optimisation criterion based on the one or more radio channel estimates and a reduced precoding matrix, wherein the reduced precoding matrix comprises properties of a single beam for each of one or more polarisation planes, and the reduced precoding matrix corresponds to an expanded precoding matrix comprising properties of a plurality of beams for each of one or more polarisation planes; and transmitting a precoding matrix indicator 'PMI' based on the selected precoding index.

While a UE has an expanded precoding matrix defining multiple beams per polarisation plane, performing a selection based on the expanded precoding matrix may be computationally expensive given the large size of the expanded precoding matrix. By using a precoding matrix that defines only one beam per polarisation plane, the size of the reduced precoding matrix is smaller than the expanded precoding matrix and therefore the calculations involved in selecting an optimum precoding index are reduced.

In some example embodiments the properties of the single beam for each polarisation plane define a beam centred on the plurality of beams for each polarisation plane defined in the corresponding expanded precoding matrix.

The simplification of the precoding matrix used in the proposed solution is achieved by defining a single centred beam in the reduced precoding matrix, rather than a corresponding cluster of beams. Defining one beam instead of several in the reduced precoding matrix reduces the complexity of calculations at the UE. By choosing a single beam that is at the centre of the corresponding cluster ensures that the overall properties of the single beam are close to the overall properties defined by the cluster of beams, thereby minimising the accuracy reduction by simplifying the precoding matrix as such. As clusters of beams are similar in direction and characteristics due to high to medium correlation in antenna configurations, the simplification has a minimum negative impact on accuracy.

In some example embodiments the plurality of beams for each polarisation plane is a cluster of beams.

In some example embodiments the properties of the single beam are based on the Discrete Fourier Transform 'DFT'. The reduced precoding matrix may be a DFT based matrix defining phase shifts which, when applied to signals at transmitters, results in beamformed signals.

In some example embodiments the precoding index fulfilling the optimisation criterion is a precoding index defining a reduced precoding matrix such that a maximum mutual information of transmission link over an effective channel is achieved, wherein the effective channel is a combination of the radio channel estimates and reduced precoding matrices.

In some example embodiments the precoding index defines one reduced precoding matrix out of a plurality of reduced precoding matrices stored in a codebook.

In some example embodiments the precoding index fulfilling the optimisation criterion is a precoding index k such that $k = \text{argmax} \sum_{n=1}^{n_H} \text{trace}((H_n \cdot W_1^{(k)}) \cdot (H_n \cdot W_1^{(k)})^H)$, wherein $H_n$ is one of the radio channel estimates and $W_1^{(k)}$ is a reduced precoding matrix selected from the codebook.

In some example embodiments the received signals are received from a plurality of transmitter antennas at a base station for transmitting signals within one or more polarisation planes.

In some example embodiments the reduced precoding matrix is of the form [X 0; 0 X] wherein X is a T×1 matrix, where T is the number of the transmitter antennas.

In some example embodiments the reduced precoding matrix is a (P*T)×P matrix, where T is the number of transmitter antennas and P is the number of different polarisation planes of the received beam signals. The corresponding expanded precoding matrix may be of the form (P*T)×(P*T).

In some example embodiments the determining one or more radio channel estimates comprises estimating a channel matrix from received reference signal data. The reference signal data may, for example, be a CSI reference signal 'CSI-RS';

In some example embodiments the precoding matrix indicator comprises the selected precoding index. By transmitting the selected precoding matrix in the PMI, the receiver of the PMI, such as a base station, may determine which cluster of beams would be the optimum cluster of beams to use in further transmissions to the UE.

In some example embodiments the PMI further comprises a second precoding index corresponding to a second precoding matrix $W_2$. By including both the selected precoding index and a second precoding index corresponding to $W_2$, the recipient of the transmitted PMI may have all the recommended precoding data for further transmission to the UE.

In another embodiment, the present disclosure provides user equipment 'UE' comprising computer executable instructions for performing the method of any of methods disclosed above.

Reference will now be made to FIG. 1 which shows an eNb 101 in wireless communication with a UE 150. In this example, an 8×2 multiple-input-multiple-output (MIMO) system is shown, where the eNb 101 has eight transmit antennas 120 and the UE has two receiver antennas 141 and 142. The proposed solution is not limited to systems in an 8×2 configuration, and the example is provided for illustrative purposes only.

One example method of transmitting data over eight antennas is transmission mode 9 (TM9), which is a transmission mode defined in Long Term Evolution Advanced (LTE-A) standard of mobile communication. TM9 provides both spatial multiplexing which increases the throughput of data transmission through use of up to eight spatial layers, and enhanced beamforming which increases the coverage of data transmission.

TM9 uses dedicated UE-specific reference signals (RS), which are placed in allocated resource blocks to enable demodulation at the UE 150. Those UE-specific reference signals are also referred to as demodulation reference signals (DMRS) 105.

Precoding is used to weight the outputs of the antenna at the eNb 101 such that the resultant beams are directed in a particular direction. In TM9 the actual precoding applied at the base station 101 is not reported to the UE 150. The precoding used is transparent for the UE, as the Physical Downlink Shared Channel (PDSCH) data and the DMRS data 105 are precoded the same way and the UE can decode the PDSCH by using the dedicated DMRS.

Channel state information (CSI) reporting is the reporting of three indicators by the UE 150 to enable the eNb 101 to modify its transmission parameters to improve the communication between the eNb 101 and UE 150. One such indicator is a recommended optimum precoding W to use for given channel conditions. However, within TM9 for frequency division duplex (FDD) and time division duplex (TDD), CSI reporting requires that the channel between the eNb 101 and UE 150 is measurable. Therefore to enable CSI reporting, CSI reference signals (CSI-RS) 106 may be used. In the case of TDD, the channel reciprocity may be used to estimate the channel conditions, so the CSI-RS may only be optionally required.

The eNb 101 comprises a number of logical antenna ports 110, and the CSI-RS 106 is placed on eight of these antenna ports, AP15&16, AP17&18, AP19&20, and AP21&22, each using the same resource element (RE) at the same time using code division multiplexing (CDM) and are transmitted to the UE 150 via the physical antenna ports 120.

The CSI-RS 106 may be transmitted sparsely in time and frequency to preserve backward compatibility with earlier LTE releases. In TM9 up to eight CSI-RS antenna ports can be used, however the proposed solution is not limited to eight antenna ports and may, for example, apply for systems with many more antenna ports.

The CSI-RS 106 data transmitted to the UE 150 enables the measurement of one channel matrix H 130 per resource block (RB) by the UE 150. The UE 150 may use the measured channel matrix H to select an optimum precoder $W_{opt}$ such that the mutual information of a transmission link based on an effective channel $H_{eff}=H*W_{opt}$ is maximised. A well-selected $W_{opt}$ may allow a narrow beam to be formed to enhance the signal-noise ratio (SNR) and provide good spatial channel conditions at the location of the UE 150.

The UE 150 may submit this optimum precoder $W_{opt}$ to the eNb 101 as a precoding matrix indicator (PMI). The eNb 101 may apply the recommended $W_{opt}$ 115 such that the PDSCH and DMRS data 105 at logical antenna ports AP7 111 and AP8 112 are precoded by $W_{opt}$ 115 and subsequently transmitted via the physical antenna ports 120.

Box 160 illustrates a simplified block diagram showing how the PDSCH and DMRS 105 data are transmitted to the UE 150 such that the effective channel matrix $H_{eff}$ is equal to $H*W_{opt}$.

In the example embodiment provided, where eight CSI-RS antenna ports and rank≤2 are used, the UE 150 may select an optimum precoding matrix $W_{opt}$ out of 256 possible candidates per rank. To simplify this selection process, the selecting of an optimum precoding matrix $W_{opt}$ may be divided into two parts, where the final reported precoder $W_{opt}$ is a product of two precoding matrices $W_1$ and $W_2$.

The UE 150 may include two precoder codebooks, a first codebook containing the possible $W_1$ precoding matrices and the second codebook containing the possible $W_2$ precoding matrices. There may be 16 $W_1$ candidates in the first codebook and 16 $W_2$ candidates in the second codebook, so that there are 256 combinations of choice of $W_1$ and $W_2$ matrices.

The UE 150 may submit the index identifying $W_1$ and the index identifying $W_2$ to the eNb 101 separately as the PMI data in different CSI reports. This may be advantageous, as the index identifying $W_1$, corresponding to the whole cluster of beams, may not need to be reported as frequently as the $W_2$ index, relating to single beams or beam pairs. By reporting the $W_1$ index separately from the $W_2$ index, the $W_1$ index need not be reported more often than necessary, thereby reducing bandwidth usage. In an alternative CSI reporting mode, both precoding matrices may be reported together.

The $W_1$ and $W_2$ precoding matrices may correspond to particular channel properties. For example, the $W_1$ precoding matrix may target wideband or long term channel properties, or both. Specifically the $W_1$ precoding matrix may indicate the correlation properties of the channel. The $W_1$ precoding matrix may be an 8×8 matrix containing the properties of a cluster of beams for each of two polarisation planes, where each cluster of beams consists of four adjacent beams. This would correspond to the eight antennas of FIG. 1, where four of those antennas are arranged in one polarisation to transmit a four-beam cluster of beams and the other four antennas are arranged in another polarisation to transmit a four-beam cluster of beams.

As the correlation properties of a cluster of beams are relatively stable over frequency and time, the $W_1$ precoding matrix may be reported less frequently than the reporting of the $W_2$ precoding matrix.

The $W_2$ precoding matrix may target frequency-selective or short-term channel properties, or both. Such properties may be instantaneous properties of an effective channel, such as phase alignment for constructive combining of transmitted signals on a receiver side, or orthogonalisation of the effective channel. Different to the $W_1$ precoding matrix, it may benefit from being reported often and in a frequency-selective manner.

Such a multi-granular two-stage precoder approach may offer a finer spatial resolution or quantization, while still limiting the feedback overhead by determining a coarse direction of the required beam cluster first, and then selecting an optimum beam within the optimum cluster of beams for each polarisation plane.

In the example embodiment provided, there are 32 possible beams that can be sent from four transmitter antennas transmitting in the same polarisation plane. The possible beams may be represented by a matrix B comprising the properties of a number of beams of beam index 0 to 31:

$$B = [b_0 b_1 \ldots b_{31}]$$

The properties of the beams may be represented by Discrete Fourier Transforms (DFT) such that the elements of the B matrix can be represented as:

$$[B]_{1+m,1+n} = e^{j\frac{2\pi mn}{32}}, m = 0, 1, 2, 3, n = 0, 1, \ldots, 31$$

Figures 2, 3:
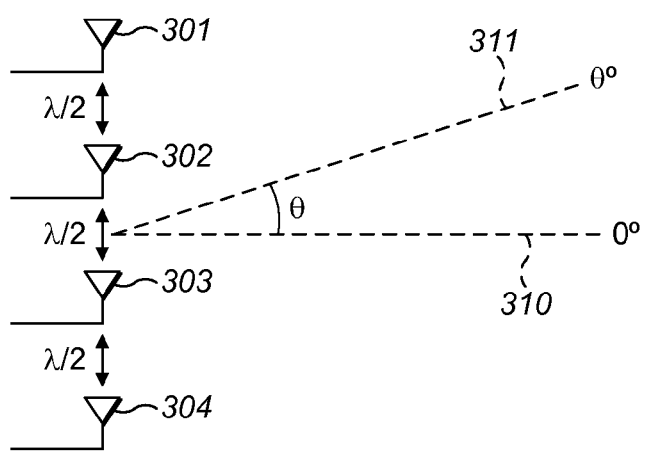
FIG. 2 is an example matrix representing the properties of 32 different 4T×DFT (Discrete Fourier Transform) beams.
FIG. 3 illustrates an example configuration and linear separation of transmission antennas in an eNb.

FIG. 2 illustrates the fully expanded B matrix 200. Each column of the B matrix 200 represents a single 4T×DFT beam, showing the spatial signature of an uniform linear array (ULA). The 4T×DFT beams defined in each column of B matrix 200 indicate phase shifts that may be performed on the outputs of a ULA so that they constructively and destructively interfere to form a desired beam signal. Each row of the B matrix represents real or complex output weighting factors related to the different transmitter antennas.

FIG. 3 illustrates a correlated co-polarised ULA with a distance 0.5λ (half-wavelength) between antennas 301, 302, 303 and 304. Line 310 provides a reference point for measuring the spatial distribution of beam signals, where line 311 indicates the angular distance from reference line 310 and a point in question. Depending on the applied phase shifts according to the columns of matrix B in FIG. 2 the generated beam can be steered in direction, where the first column of matrix B corresponds to the reference line 310 of FIG. 3.

FIG. 4 visualises the principle of beams and cluster of beams 410 of an example beam cluster on a polar diagram 400 with the 0° point corresponding to the reference line 310 of FIG. 3. FIG. 4 illustrates a first cluster of beams 410 with beam cluster index 0 consisting of beams 401, 402, 403 and 404 with beam indexes of n=0, 1, 2 and 3 respectively. These beams 401, 402, 403 and 404, correspond to the first four columns 430, 431, 432 and 433 of beam matrix B 420. These first four columns define the beam cluster 440 of index 0.

Together, the 16 possible clusters of four-beams cover the whole sector (here a 180 degree sector is assumed). As there are a total of 32 beams covering the whole sector a single cluster of beams covers 1/(32/4)=⅛ (12.5%) of the sector area. The 16 clusters of beams are at least partially overlapping. For example, the cluster of beams with index 0 consists of beams 0, 1, 2, and 3, the cluster of beams with index 1 consists of beams 2, 3, 4, and 5, and the cluster of beams with index 15 consists of beams 30, 31, 0, and 1. Each of these correlated beam clusters have beams pointing in substantially the same direction.

Figure 5:
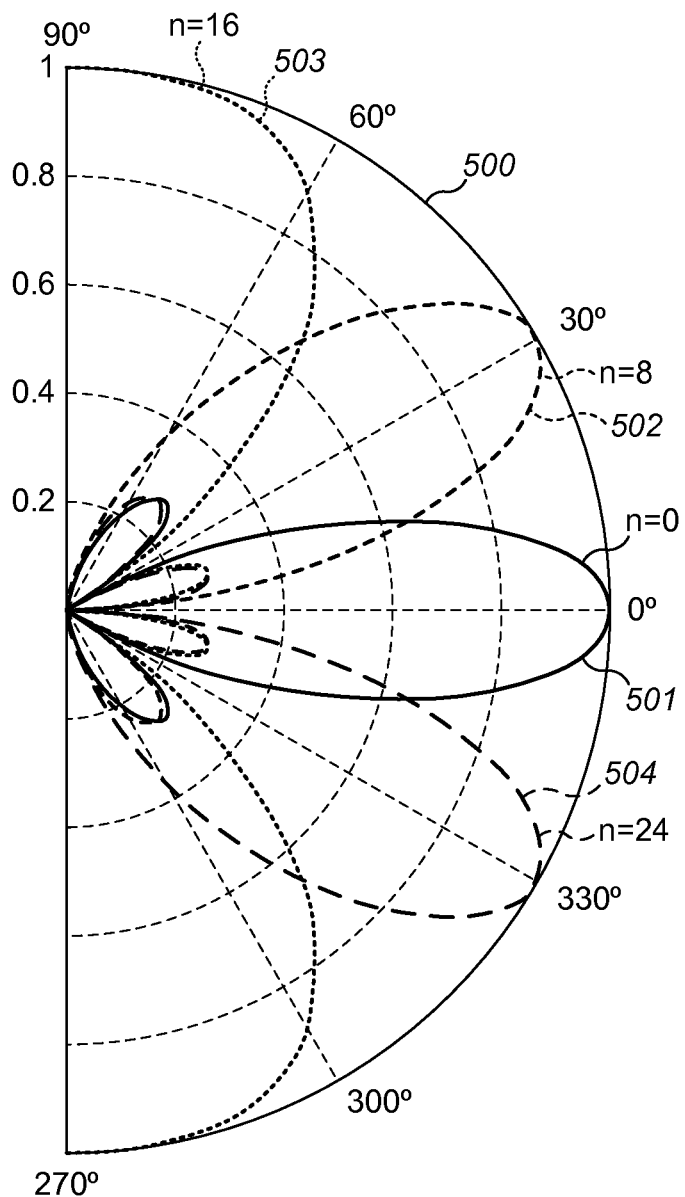
FIG. 5 is a polar diagram illustrating the signal strength in the antenna plane of example beams transmitted in an eNb with different index values.

FIG. 5 is a polar diagram 500 illustrating the spatial signature of four example beams 501, 502, 503 and 504 with different index values of n=0, 8, 16 and 24. The polar diagram 500 illustrates how the whole 180° sector can be addressed by the beams.

To direct transmitted signals from an eNb 101 to the physical location of a UE 150, a precoding matrix $W_1$ may be selected such that it defines a beam cluster directed in a way that maximises the signal strength at the UE 150.

A set of matrices $X^{(k)}$ comprises matrices that define the possible clusters of beams, in this example the 16 possible beam clusters:

$$X^{(k)} \in \{[b_{2k \bmod 32} b_{(2k+1) \bmod 32} b_{(2k+2) \bmod 32} b_{(2k+3) \bmod 32}], k = 0, 1, \ldots, 15\}$$

A precoding matrix $W_1$ may then represent a cluster of beams for each polarisation plane in the form of:

$$W_1^{(k)} = \begin{bmatrix} X^{(k)} & 0 \\ 0 & X^{(k)} \end{bmatrix}$$

The precoding matrix $W_1$ may be of the form of a block diagonal matrix, where the non-diagonal block elements are 0 and each of the blocks within the diagonal represent a cluster of beams. In the example of a transmission mode where two different polarisations are used, the first block element of the diagonal may represent the beam cluster to be transmitted in a first polarisation, and the second block element of the diagonal may represent the beam cluster to be transmitted in a second polarisation. For example, a precoding matrix $W_1$ representing the beam cluster of index 0 (410) shown in FIG. 4, may be of the form:

$$W_1^{(k=0)} = \begin{bmatrix} b_0 & b_1 & b_2 & b_3 & 0 & 0 & 0 & 0 \\ 0 & 0 & 0 & 0 & b_0 & b_1 & b_2 & b_3 \end{bmatrix}$$

FIG. 6 shows the full precoding matrix $W_1$ 600 with beam cluster of index 0. The first block element 610 is the cluster of beams as shown in 440 of FIG. 4. The next block element 620 in the diagonal is the DFT of the cluster of beams with index 0, but in a different polarisation plane. In this example, it is assumed that the polarisation planes are fully orthogonal such that there is no cross-correlation between the two polarisation planes, resulting in the block diagonal properties of the matrix 600.

A codebook for the precoding matrix $W_1$, also referred to as a first codebook, may comprise a set of precoding matrices $W_1$ where each of the precoding matrices $W_1$ define precoding properties for a different cluster of beams. Such a codebook could be represented as:

$$C_1 = \{W_1^{(0)}, W_1^{(1)}, W_1^{(2)}, \ldots, W_1^{(15)}\}$$

To select an optimum precoding matrix $W_1$, the UE 150 may take each element of the codebook and determine which of these elements, when combined with the channel matrix estimates determined from the CSI-RS data 106, would result the maximum effective channel power.

One example method of determining the optimum precoding matrix $W_1$ is to find the precoding index $k_{opt}$ such that:

$$k_{opt} = \text{argmax}_k \sum_{n=1}^{n_H} \text{trace}(P_{n,k})$$

where $$P_{n,k} = (H_n \cdot W_1^{(k)}) \cdot (H_n \cdot W_1^{(k)})^H = H_{\text{eff},n,k} \cdot H_{\text{eff},n,k}^H = \begin{bmatrix} a_{n,k} & b_{n,k} \\ c_{n,k} & d_{n,k} \end{bmatrix}$$

so that $k_{opt} = \text{argmax}_k \sum_{n=1}^{n_H} a_{n,k} + d_{n,k}$ for $n = 1 \ldots n_H$, and $k = 0 \ldots 15$ In other words, the UE 150 may calculate the value $H_{\text{eff},n,k}$ for each combination of $H_n$ and $W_1^{(k)}$, find the value $P_{n,k}$ for each of these combination, and then determine which value of k results in the greatest sum of the trace of $P_{n,k}$. This value of k, $k_{opt}$, indicates the precoding matrix $W_1$ within the first codebook that would result in the greatest mutual information of a transmission link.

However, if the precoding matrix $W_1$ is of the form shown in FIG. 6, for example, it would be a large 8×8 matrix defining the properties of four beams for each beam cluster, and all 16 of these large 8×8 matrices would be involved in the calculation of the $P_{n,k}$ and therefore $k_{opt}$, resulting in a large number of computations required at the UE 150. As UEs 150 are often limited in processing power, storage space, and battery capacity, there is a need to ensure that the amount of computations required at the UE is kept at a minimum.

The proposed solution provides a lower complexity strategy for finding an optimum $W_1$ index. Different from the approach of using the full $W_1$ matrix defining all the beams in a cluster per polarisation plane, the proposed solution proposes the use of a single centred beam per polarisation plane, which may be located in the middle of each cluster of beams.

FIG. 7 illustrates the difference in a full precoding matrix $W_1$ 700 that shows all the beams in a cluster of beams for each polarisation plane, compared to a reduced precoding matrix $W_{1,\text{new}}$ 730 which has only one beam per polarisation plane.

The 'centre' of the beam cluster in the first polarisation plane of the original $W_1$ 700 is represented by line 710. This centred beam is represented by the values of block 740 in the reduced precoding matrix $W_1$ 730. There are several techniques for determining the values of this centred beam, for example, it could be made up of the average of values of the second and third beams shown in the cluster of beams of the full precoding matrix $W_1$, or it may take into account the other beams in the beam cluster as well.

The line 720 represents the centre of the beam cluster for the second polarisation plane shown in the expanded precoding matrix $W_1$ 700, and the centred beam representing this cluster of beams in the second polarisation plane is shown in block 750 of the $W_{1,\text{new}}$ precoding matrix 730 of the proposed solution.

Figure 8:
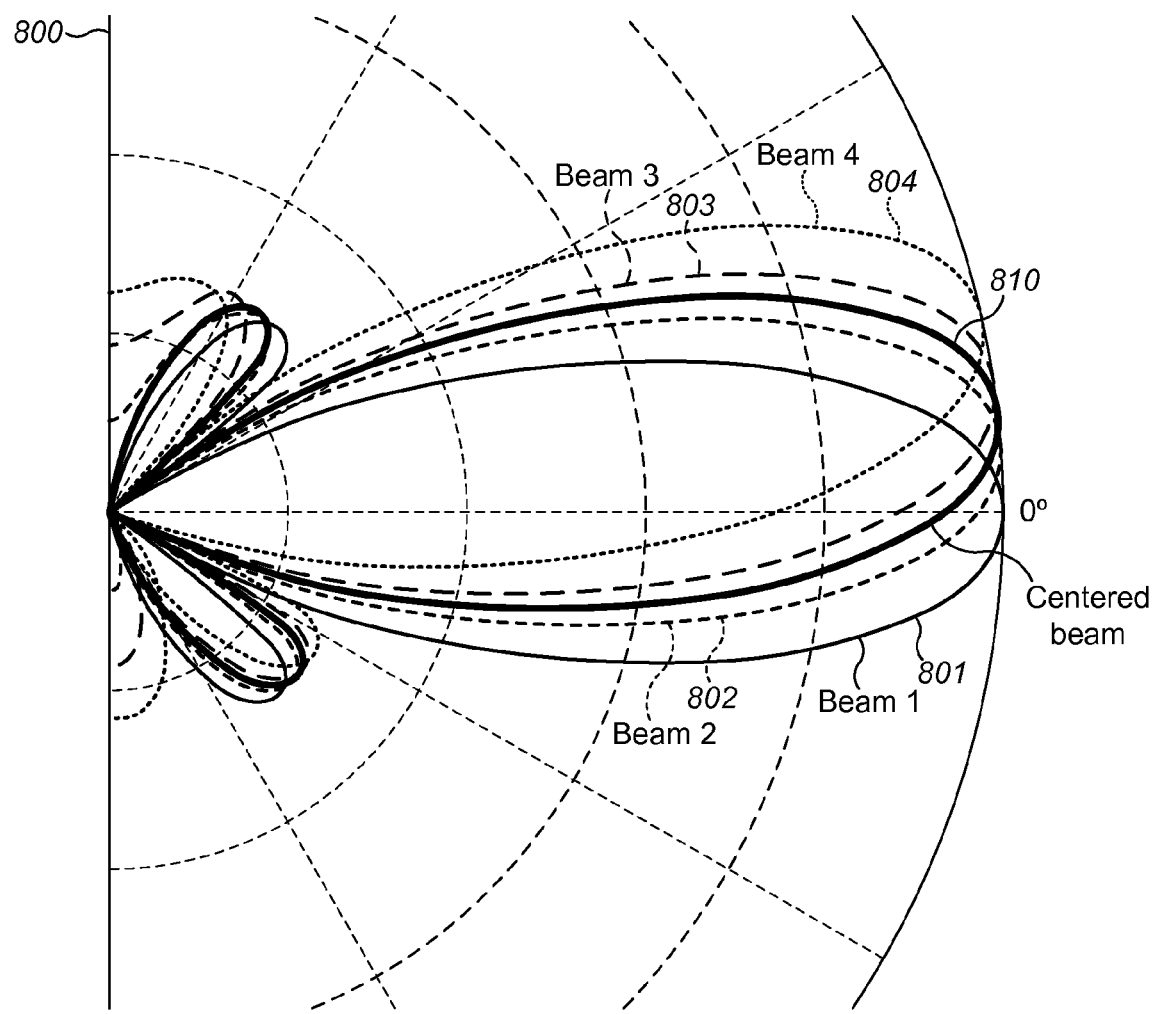
FIG. 8 is a polar diagram illustrating the difference in beam signal strengths of signals defined by an example precoding matrix, $W_1$, and the signals defined by a corresponding simplified precoding matrix, $W_{1,new}$, in accordance with the proposed solution.

FIG. 8 visualises the difference in the beams defined in the original precoding matrix $W_1$ 700 compared to the corresponding single centred beam of the corresponding reduced precoding matrix 730. The polar diagram 800 shows the four beams 801, 802, 803 and 804 of a beam cluster of index 0. The centred beam 810 is in the middle of these four beams. In the case of highly correlated channels, reducing a beam cluster to a single averaged beam may not reduce the accuracy of subsequent calculations too much as it is still in the same general direction of the original beam cluster as a whole. The reduction in computational complexity, however, by using precoding matrices with only a single beam defined per polarisation plane would be very large, requiring less than 50% of the computational complexity compared to using the larger precoding matrix.

Highly correlated channels, caused by high antenna correlation, are often necessary in methods such as TM9 in order to realise a multiple user MIMO (MU-MIMO) communication system in an efficient way via Spatial Division Multiple Access (SDMA). Even in the case of medium antenna correlation, the proposed approach has been found to have a 99.24% agreement with the approach using a full $W_1$ precoding matrix.

The UE 150 may include three codebooks, one containing the full 8×8 precoding matrices for $W_1$, another containing the corresponding reduced 8×2 precoding matrices for $W_1$, and the other containing the $W_2$ precoding matrices.

Alternatively, the UE 150 may originally only have the full $W_1$ and $W_2$ precoding matrices stored on the device, and may generate a codebook of reduced precoding matrices $W_{1,\text{new}}$ itself based on the original $W_1$ codebook, before subsequently storing it within the device and using this reduced codebook for the calculation of optimum index for $W_1$.

Once the UE 150 has determined the index of an optimum precoding matrix $W_1$ using the reduced precoding matrices, it may go on to determine the index of an optimum $W_2$ matrix given the optimum $W_1$ matrix. In particular, the $W_2$ may be considered to be a 'selection matrix' where it may select from the optimum $W_1$ matrix a single or pair of beams (depending on if it is rank=1 or 2) per polarisation plane.

In an example scenario where there are 16 $W_1$ precoding matrices to select from, and there are 110 H channel estimates, the UE 150 may process all 110 H matrices with a first precoding matrix $W_1^{(k=0)}$ of the codebook using single centred beam, before repeating this 110 times for each precoding matrix in the codebook. This may be considered as a serial processing implementation of the proposed solution.

Different to the serial processing implementation, the proposed solution may use parallel processing, such that for each single H matrix, all 16 $W_1$ matrices are processed in parallel. Using parallel processing in this way may allow the UE 150 to exploit the redundancy in the data of the single centred beams. This may result in a quarter of the multiplications required for calculating the effective channel matrices $H_{\text{eff}} = H*W_1$ compared to an approach using full precoding matrices and no exploitation of the redundancy found within them.

To process $H_{\text{eff}} = H*W_1$ using the serial processing approach, where the $W_1$ matrices are 8×2 and the H matrices are 2×8 would result in 16×[4×(4M+3A)]=256M+192A calculations, where M are complex multiplications and A are complex additions. To process $H_{\text{eff}}$ using parallel processing on the other hand would require only 4×[4×(4M+3A)]=64M+192A calculations. Both of these approaches compared to a non-optimized approach using full 8×8 precoding matrices would require substantially less computation power, as such an approach requires 16×[16×(4M+3A)]=1024M+768A calculations.

The overall calculations also require the calculation of $|H_{\text{eff}}|^2$, which are 16×[4×(2M+A)]=128M+64A for the serial and parallel approaches of the proposed solution, and 16×[4×(8M+7A)]=1536M+1216A for a non-optimized approach using the full 8×8 precoding matrices.

Assuming that the computational cost of multiplication is 20 times more than the computational cost of addition (i.e. M=20 and A=1), the overall complexity of the serial and parallel approaches to calculating $H_{\text{eff}}$ may be represented by complexity numbers 7936 (384×20+256×1) and 4096 (192×20+256×1) respectively. When compared to the approach using the full 8×8 precoding matrixes which has a complexity number of 31936 (1536×20+1216×1), the representative complexity numbers of the serial and parallel proposed solution are 24.85% and 12.83% respectively of the computational cost of the non-optimized traditional approach.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

The invention claimed is:

1. A method at user equipment 'UE', the method comprising:
   determining one or more radio channel estimates from received signals;
   selecting a precoding index fulfilling an optimisation criterion based on the one or more radio channel estimates and a reduced precoding matrix, wherein the reduced precoding matrix comprises properties of a single beam for each of one or more polarisation planes, and the reduced precoding matrix corresponds to an expanded precoding matrix comprising properties of a plurality of beams for each of one or more polarisation planes, and wherein the properties of the single beam for each polarisation plane define a beam centred on the plurality of beams for each polarisation plane defined in the corresponding expanded precoding matrix; and
   transmitting a precoding matrix indicator 'PMI' based on the selected precoding index.

2. The method of claim 1, wherein the plurality of beams for each polarisation plane is a cluster of beams.

3. The method of claim 1, wherein the properties of the single beam are based on the Discrete Fourier Transform 'DFT'.

4. The method of claim 1, wherein the precoding index fulfilling the optimisation criterion is a precoding index defining a reduced precoding matrix such that a maximum mutual information of transmission link over an effective channel is achieved, wherein the effective channel is a combination of the radio channel estimates and reduced precoding matrices.

5. The method of claim 1, wherein the precoding index defines one reduced precoding matrix out of a plurality of reduced precoding matrices stored in a codebook.

6. The method of claim 5, wherein the precoding index fulfilling the optimisation (criterion is a precoding index k such that k=argmax $\Sigma_{n=1}^{nH}\text{trace}((H_n \cdot W_1^{(k)}) \cdot (H_n \cdot W_1^{(k)})^H)$, wherein $H_n$ is one of the radio channel estimates and $W_1^{(k)}$ is a reduced precoding matrix selected from the codebook.

7. The method of claim 1, wherein the received signals are received from a plurality of transmitter antennas at a base station for transmitting signals within one or more polarisation planes.

8. The method of claim 7, wherein the reduced precoding matrix is of the form [X 0; 0 X] wherein X is a T×1 matrix, where T is the number of the transmitter antennas.

9. The method of claim 7, wherein the reduced precoding matrix is a (P*T)×P matrix, where T is the number of transmitter antennas and P is the number of different polarisation planes.

10. The method of claim 1, wherein the determining one or more radio channel estimates comprises estimating a channel matrix from received reference signal data.

11. The method of claim 1, wherein the PMI comprises the selected precoding index.

12. The method of claim 11, wherein the PMI further comprises a second precoding index corresponding to a second precoding matrix $W_2$.

13. A user equipment 'UE' comprising:
   one or more processors; and
   memory comprising instructions which when executed by the one or more processors cause the UE to:
     determine one or more radio channel estimates from received signals;
     select a precoding index fulfilling an optimisation criterion based on the one or more radio channel estimates and a reduced precoding matrix, wherein the reduced precoding matrix comprises properties of a single beam for each of one or more polarisation planes, and the reduced precoding matrix corresponds to an expanded precoding matrix comprising properties of a plurality of beams for each of one or more polarisation planes, and wherein the properties of the single beam for each polarisation plane define a beam centred on the plurality of beams for each polarisation plane defined in the corresponding expanded precoding matrix; and
     transmit a precoding matrix indicator 'PMI' based on the selected precoding index.

14. The UE of claim 13, wherein the plurality of beams for each polarisation plane is a cluster of beams.

15. The UE of claim 13, wherein the properties of the single beam are based on the Discrete Fourier Transform 'DFT'.

16. The UE of claim 13, wherein the precoding index fulfilling the optimisation criterion is a precoding index defining a reduced precoding matrix such that a maximum mutual information of transmission link over an effective channel is achieved, wherein the effective channel is a combination of the radio channel estimates and reduced precoding matrices.

17. The UE of claim 13, wherein the precoding index defines one reduced precoding matrix out of a plurality of reduced precoding matrices stored in a codebook.

18. The UE of claim 17, wherein the precoding index fulfilling the optimisation criterion is a precoding index k such that k=argmax $\Sigma_{n=1}^{nH}\text{trace}((H_n \cdot W_1^{(k)}) \cdot (H_n \cdot W_1^{(k)})^H)$, wherein $H_n$ is one of the radio channel estimates and $W_1^{(k)}$ is a reduced precoding matrix selected from the codebook.

19. The UE of claim 13, wherein the received signals are received from a plurality of transmitter antennas at a base station for transmitting signals within one or more polarisation planes.

20. The UE of claim 19, wherein the reduced precoding matrix is of the form [X 0; 0 X] wherein X is a T×1 matrix, where T is the number of the transmitter antennas.

21. The UE of claim 13, wherein the determining one or more radio channel estimates comprises estimating a channel matrix from received reference signal data.

22. The UE of claim 13, wherein the PMI comprises the selected precoding index.

23. The UE of claim 22, wherein the PMI further comprises a second precoding index corresponding to a second precoding matrix $W_2$.

* * * * *